US Patent Office
3,294,769
Patented Dec. 27, 1966

3,294,769
PREPARATION OF GLYCIDYL ESTER COPOLYMERS
Darrell D. Hicks, Louisville, Ky., assignor, by mesne assignments, to Devoe & Raynolds Company, Inc., a corporation of Delaware
No Drawing. Filed Oct. 27, 1959, Ser. No. 849,114
9 Claims. (Cl. 260—86.1)

This invention relates to glycidyl ester copolymers, and specifically to an improved method for their preparation. By "glycidyl ester copolymer" as used herein is intended the class of copolymers containing

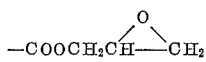

groups in the molecule. Glycidyl ester copolymers are well known. They have been prepared heretofore by the polymerization of glycidyl acrylate, glycidyl methacrylate, or glycidyl crotonate with a compound copolymerizable therewith to form the glycidyl ester copolymer as described in U.S. 2,580,901, 2,524,432 and other patents.

According to these known processes, a glycidyl ester having the following formula,

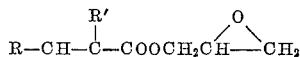

is polymerized with a monethylenically unsaturated monomer such as styrene, vinyl acetate, ethyl acrylate, acrylonitrile etc. copolymerizable therewith, R and R' being hydrogen or methyl radicals. Copolymers of this type are quite expensive, primarily because of the problems involved in their preparation. The glycidyl acrylate or other unsaturated glycidyl ester monomer must be made and isolated, and, because of its reactivity many difficulties accompany the synthesis and use of this monomer. After the glycidyl ester is prepared its reaction mixture must be distilled to isolate the pure monomer. It is not easy to distill this material without the formation of at least some polymer. It is therefore quite difficult to prepare glycidyl acrylate or other gylcidyl esters except in quite low yields. The material is toxic and in addition must be used fairly soon after it is synthesized or else inhibited to prevent further polymerization prior to its use. Inhibitor removal means must then generally be employed.

In accordance with the practice of this invention a process is provided which overcomes the aforementioned difficulties. It has been found that under certain conditions glycidyl ester polymers can be made from acrylic, methacrylic, or crotonic acid polymers rendering it unnecessary to start with glycidyl acrylate or methacrylate. If the polymer or copolymer is reacted with an epihalohydrin in the presence of certain catalysts, and if at the beginning of this copolymer-epihalohydrin reaction the equivalent ratio of epihalohydrin to carboxy polymer is at least 8 to 1, an excess of 7 equivalents epihalohydrin to one equivalent carboxy copolymer, an uncrosslinked polymer results in which more than 95 percent and generally 99 per cent of the carboxy groups are converted to halohydrin ester groups. The halohydrin ester groups can then be dehydrohalogenated to form glycidyl ester groups. By equivalent ratio is meant the ratio of equivalents of epihalohydrin to equivalents polymer, considering an equivalent polymer as the weight in grams of polymer containing one carboxyl group and an equivalent epihalohydrin as the weight in grams of epihalohydrin containing one epoxide group.

While it is possible to prepare the acrylic, methacrylic, or crotonic acid copolymer in a medium other than an epihalohydrin, or in a mixture of an inert solvent and the epihalohydrin, later adding part or all of the halohydrin to provide the excess required during the reaction with the carboxy groups of the copolymer, I find it desirable to effect the free radical solution polymerization of the acid and other monomers in the epihalohydrin medium. Except for the fact that an epihalohydrin such as epichlorohydrin is used as the reaction medium, the solution polymerization of monounsaturated acids with other monomers is well known. Polymerization is effected by conventional solution polymerization techniques using a free radical polymerization catalyst, for example an unsymmetrical azo compound, or a peroxide, for instance, azo-bis-isobutyronitrile, benzoyl peroxide, ditertiary butyl peroxide, cumene hydroperoxide and the like, and a temperature of 125° C. to 130° C. During the polymerization, the epihalohydrin can of course be mixed with or replaced by known organic solvents such as ethanol, propanol, ethyl butanol, diisobutyl ketone, methyl propyl ketone, methylisobutyl ketone, ethyl benzene, xylene, toluene, benzene, hydroxy-ethyl acetate, ethyl acetoacetate, 2-ethoxy-ethyl acetate, propylene glycol methylether or ethoxytriglycol, in other words, ethers, esters, ketones, alcohols and hydrocarbon solvents. The monomer-reaction medium mixture is generally at least 40 percent reaction medium by weight.

The carboxy copolymers are derived from an ethylenically unsaturated alpha, beta-monocarboxylic acid having a single double bond and not more than four carbon atoms, in other words, acrylic acid, methacrylic acid or crotonic acid. Copolymerized with the alpha,beta-unsaturated acid are ethylenically unsaturated monomers copolymerizable therewith containing a single double bond, i.e. a single vinyl, vinylene or vinylidene group.

Particularly important monomers are vinyl aromatic compounds, for instance, styrene, vinyl toluene, alpha-methyl styrene, the halostyrenes, etc. having a single vinyl group and free of other substituents capable of reacting with an unsaturated acid. Also valuable are saturated alcohol esters of acrylic, methacrylic and crotonic acids. Examples of vinyl aromatic monomers are isopropenyl toluene, the various dialkyl styrenes, ortho-, meta-, and para-chlorostyrenes, bromostyrenes, fluorostyrenes, cyanostyrenes, vinyl naphthalene, the various alpha-substituted styrenes, e.g., alpha-methyl styrenes, alpha-methyl para-methyl styrenes, as well as various di-, tri-, and tetra-chloro, bromo, and fluorostyrenes. Acrylic, methacrylic, and crotonic esters of saturated alcohols include the methyl, ethyl propyl, isopropyl, n-butyl, isobutyl, (sec)butyl, (tert)butyl, amyl hexyl, heptyl, octyl, decyl, dodecyl, etc. esters of acrylic, methacrylic and crotonic acids. Thus, preferred monomers include alpha, beta unsaturated monocarboxylic acid esters of saturated monohydric alcohols, the acids having not more than 4 carbon atoms and the alcohols having not more than 20 carbon atoms, desirably 6, and monovinyl aromatic compounds.

Other known monomers which can be used in the preparation of the carboxy-polymer include vinyl aliphatic cyanides of not more than four carbon atoms, for example, acrylonitrile and methacrylonitrile. Also included are monovinyl ethers, e.g., ethyl vinyl ether, ethyl methally ether, vinyl butyl ether, methyl vinyl ether and others of not over 20 carbon atoms. Unsaturated monohydric alcohol esters of saturated monobasic acids are also intended wherein the alcohols contain a single double bond and the acids have not more than 20 carbon atoms, for instance, vinyl acetate, vinyl stearate, and the allyl, methallyl and crotyl esters of propionic, butyric and other acids, and, of course, not only the monomers themselves but mixtures of the monomers can be copolymerized with the alpha-beta unsaturated acids to form the carboxy polymer. However, when mixtures are employed a certain degree of selectivity must be exercised, since there will be certain combinations of monomer and crotonic acid which are undesirable. A desirable polymer includes up to 4 percent N-vinyl pyrrolidone, 5 to 50 percent acid and the remainder other monomer such as styrene, vinyl toluene or methyl methacrylate. In case of acrylate esters, however, more than about 20 percent often presents complications in obtaining haze-free solutions. Hence, another monomer such as vinyl toluene or a methacrylate ester should be used with the acrylates. In general the copolymer contains about 5 to about 75 percent alpha, beta-unsaturated acid, the remainder being the monethylenically unsaturated monomer.

To prepare the halohydrin ester of this copolymer, the copolymer is reacted with an epihalohydrin through the epoxide group of the epihalohydrin and a carboxyl group of the copolymer. Thus, the carboxyl groups in the copolymer become

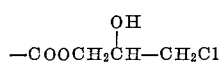

groups. It is then necessary to convert these halohydrin ester groups to oxirane groups by known dehydrohalogenation reactions. Epihalohydrins used in preparing these polyhalohydrin esters include epichlorohydrin, epibromohydrin, and epiiodohydrin, preferably in the alpha form. These materials are all characterized by a three carbon chain; however, analogs of the aforesaid epihalohydrins can also be used, such as beta- and gamma-methyl epichlorohydrins, etc. In the preparation of the halohydrin ester it has been found that the equivalent ratio of epihalohydrin to carboxy copolymer must be above a certain minimum when the catalyzed reaction is carried out or the system will gel. This minimum appears to vary somewhat with the copolymer but generally it is at least 8 to 11 equivalents epihalohydrin to 1 carboxy equivalent copolymer.

It has been pointed out that in its preferred embodiment this invention contemplates the preparation of the carboxy copolymer in the epihalohydrin as a solvent reaction medium. However as the amount of acrylic or other carboxylic acid in the copolymer increases the solubility of the copolymer in epihalohydrin decreases so that with higher acid level copolymers, say above 40 to 50 percent acid, a combination of epichlorohydrin and a solvent more polar than epichlorohydrin must be used such as the glycol-ethers, for instance propylene glycol methyl ether, dipropylene glycol methyl ether, ethylene glycol methyl ether and the like. Under these circumstances, or where the carboxy copolymer is made in an organic solvent as previously described, a mixture of solvent and epichlorohydrin will be present during the formation of chlorohydrin ester copolymer. So long as the epichlorohydrin to carboxy copolymer equivalent ratio is greater than 8–11 to 1 the presence or absence of organic solvent has little effect, except on the solubility. Thus if the copolymer is made in a solvent all of the solvent should not be stripped out on addition of epichlorohydrin if the chlorohydrin ester copolymer is not soluble in epichlorohydrin. The weight ratio of solvent to epichlorohydrin is thus independent of the conversion to halohydrin ester. However, as a practical matter it generally is not over 1 to 1.

Using the necessary epichlorohydrin to carboxy copolymer equivalent ratio the formation of the halohydrin ester copolymer is accomplished by the use of a catalyst which will promote the reaction of the epoxy group of the epihalohydrin with the carboxyl group of the copolymer. Particularly effective catalysts are quaternary ammonium salts. Tertiary amines and quaternary ammonium hydroxides can also be used although not with equivalent results. These catalysts are less efficient and as a consequence the resulting product is more difficult to work with in carrying out the remaining steps of the process. In studying effective catalysts it was found that the N-vinyl pyrrolidones function quite well, particularly N-vinyl-2-pyrrolidone, as a catalyst, either when it is used as a monomer or when it is added later. It is, however, a more efficient catalyst when added later. Examples of suitable catalysts are methyl diethyl amine, dimethyl aminomethyl phenol, dimethyl ethyl amine, triethyl amine, ethyl dipropyl amine, benzyl trimethyl ammonium acetate, benzyl triethyl ammonium formate, benzyl trimethyl ammonium chloride, tetramethyl ammonium chloride, tetraethyl ammonium hydroxide, benzyl trimethyl ammonium hydroxide, etc. When such a condensing catalyst is used the reaction takes place at a temperature between 50° C. and 175° C. In general temperatures of 100° C. to 120° C. are desirable. Usually the temperature rises appreciably at the beginning of the reaction so that efficient cooling must be applied to prevent too rapid a rise in temperature. The extent of conversion to halohydrin ester is determined by the reduction in acid number.

The dehydrohalogenation of the halohydrin ester involves the conversion of chlorohydrin groups of the ester to oxirane or 1,2-epoxide groups, thus,

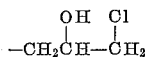

to

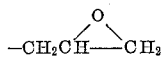

The dehydrohalogenation of the polyhalohydrin ester groups is accomplished through the use of a number of alkaline materials as shown in patents, U.S. 2,061,377, U.S. 2,070,990, U.S. 2,224,849, U.S. 2,248,635, U.S. 2,314,039. Illustrative of such alkaline materials are sodium and potassium carbonates and bicarbonates, hydroxides of magnesium, zinc, lead, iron and aluminum, and the corresponding oxides. In general, however, it is preferred to use flake or dispersed caustic alkali, that is an alkali metal hydroxide. Dehydrohalogenation is accomplished by heating the alkali and halohydrin ester at 50° C. to about 115° C. depending upon the alkaline material used and using sufficient alkaline material to combine with the halogen of the halohydrin groups of the polymer. The dehydrohalogenation reaction can be carried out without difficulty following the aforementioned patents, the only requirement being that the dehydrohalogenation reaction must be carried out in the presence of an epihalohydrin, i.e. using an epihalohydrin or an epihalohydrin-solvent mixture as the dehydrohalogenation medium. The solvent in admixture with the epihalohydrin must, of course, not be reactive with the caustic alkali used to bring about the dehydrohalogenation. This excludes the esters mentioned hereinbefore as solvents for the polymerization reaction and the reaction of the polymer with the epihalohydrin. It is preferred to use caustic alkali in the form of flakes or fine particles dispersed in the xylene, ketone or other solvent. In this connection, it has been found that reaction time is shortened by the use of dispersed sodium hydroxide rather than the flake material. It is preferred to carry out the dehydrohalogenation reaction using the same excess epihalohydrin and the same solvent or solvents in which the halohydrin ester was formed. The dehydrohalogenation efficiency varies directly with the excess epihalohydrin present during dehydrohalogenation. Thus, as less epihalohydrin is used than the excess of 7 equivalents epihalohydrin per halohydrin ester group (originally per carboxyl equivalent) the dehydrohalogenation efficiency decreases, and when less than two equivalents epihalohydrin per halohydrin ester group are used the process becomes impractical to carry out. Dehydrohalogenation efficiency is found by dividing the theoretical weight per epoxide (epoxide equivalent) by the actual epoxide equivalent obtained if all of the carboxyl groups are converted to glycidyl ester groups as determined by titration.

As in the case of the polymerization and polyhalohydrin ester formation reactions, the dehydrohalogenation reaction is also well known. It is to be understood, however, that when quaternary ammonium salts are used to catalyze the carboxy-epoxy reaction (the reaction of the carboxy copolymer with epihalohydrin) some dehydrohalogenation will have taken place. Mueller, U.S. 2,772,296, has disclosed that when carboxylic acids are reacted with epihalohydrins in the presence of an excess of at least twice the chemical equivalent of epihalohydrin and if a quaternary ammonium slat is used as a catalyst the epoxy esters are formed directly and there is no need for removing any hydrogen halide or salt. Dehydrohalogenation efficiency is, of course, not as high using only the Mueller process. The copolymer is being reacted with the epihalohydrin and the resulting halohydrin ester groups are being dehydrohalogenated almost simultaneously. Whereas the extent of reaction of carboxyl groups with epihalohydrin to form the halohydrin esters is determined by the reduction in acid number, the extent of conversion of the halohydrin group to the epoxide group, i.e. oxirane group, is found by determining the epoxide equivalent of the resulting epoxy or glycidyl ester copolymer. The epoxide equivalent is the weight in grams of product per epoxide group. After the dehydrohalogenation in the epichlorohydrin or other halohydrin medium, the material is distilled to remove an azeotrope of epichlorohydrin and water. The material is then filtered if desired. The epihalohydrin is removed by distillation, the material is filtered and the desired solvent is added.

The following examples illustrate the principles and practice of this invention in greater detail. The examples are illustrative only and are not intended to limit the invention.

EXAMPLE 1

| Material | Weight Percent | Parts by Weight |
|---|---|---|
| Butyl acrylate | 17.0 | 136.0 |
| Methyl methacrylate | 41.2 | 329.6 |
| Vinyl toluene | 26.6 | 212.8 |
| Methacrylic acid | 13.2 | 105.6 |
| N-vinyl-2-pyrrolidone | 2.0 | 16.0 |
| Benzoyl peroxide | | 20.0 |
| Benzyl-trimethyl ammonium chloride (60 percent aqueous) | | 3.6 |
| Sodium hydroxide dispersion (40 percent in xylene) | | 123.0 |
| Epichlorohydrin | | 1,250.0 |
| Equivalent ratio of epichlorohydrin to methacrylic acid at the beginning of the polymerization | | 11 to 1 |
| Equivalent ratio of epichlorohydrin to carboxy polymer at the beginning of the formation of halohydrin ester | | 11 to 1 |

*Polymerization*

Into a 3 liter flask equipped with stirrer, reflux condenser, thermometer, and dropping funnel are charged 1200 grams of the epichlorohydrin. In a separate container a monomer-catalyst solution is prepared by combining the butyl acrylate, the methyl methacrylate, the vinyl toluene, the methacrylic acid and the vinyl pyrrolidone in the amounts in grams shown above with 16 grams of the benzoyl peroxide. The epichlorohydrin is heated to a temperature of 115° C. to 120° C. with agitation to maintain a moderate reflux. At this temperature and over a period of from one to two hours the monomer-catalyst solution is added through the dropping funnel. After all of the monomer-catalyst solution is added the temperature of the flask contents is held at 115° C. to 120° C. for a period of 60 to 90 minutes. A solution of the additional 4 grams of benzoyl peroxide in the 50 grams of epichlorohydrin is added slowly and the mixture is stirred for a period of 2 to 4 hours at 115° C. to 120° C. At the end of the 4 hours a non-volatile determination on the flask contents shows the conversion of monomer to polymer to be above 99 percent.

*Halohydrin ester formation*

To bring about a reaction of the carboxy copolymer with 113.5 parts of the total 1250 parts of epichlorohydrin present, the 3.6 grams of benzyl trimethyl ammonium chloride solution are added to the resulting solution which is held at a temperature of 115° C. to 120° C. for an additional one to two hours to produce a solution having an acid value of less than one and containing 43.5 percent product in epichlorohydrin.

*Dehydrohalogenation*

The 43.5 percent solution is cooled to a temperature of 25° C. to 50° C. and the 123 grams of 40 percent sodium hydroxide dispersed in xylene are added. The flask contents are then heated to 90° C. and held at that temperature for a period of 30 to 45 minutes. The flask is then adapted for vacuum distillation and an epichlorohydrin-water azeotrope, 143 grams, is distilled off at 15–30 mm. Hg and 60° C. to 80° C. The remaining solution is filtered through a pressure filter utilizing a filter aid. After the material is filtered the solution is again vacuum distilled at 40° C. to 70° C. until it becomes quite viscous. At this point the first of about 5 aliquots of high flash naphtha is added and distillation is continued. The total amount of high flash naphtha used is about one and one-half times the theoretical amount of epichlorohydrin to be removed. The other four aliquots of high flash naphtha are added during the distillation which is continued until a 10 to 20 gram fraction of distillate is obtained which has a weight per epoxide of at least 10,000, indicating the presence of less than 1 percent epichlorohydrin in the distillate coming over at this point. The resulting glycidyl methacrylate copolymer solution after again being pressure filtered consists of 53.4 percent product in high flash naphtha, has a Gardner-Holdt viscosity of $Z_1$ to $Z_2$, a color of 2 (Gardner scale) and an actual epoxide equivalent of 838 (excluding solvent). The theoretical epoxide equivalent if all carboxyl groups are converted to glycidyl ester is 706.

EXAMPLE 2

| Material | Weight Percent | Parts by Weight |
|---|---|---|
| Methyl methacrylate | 53.5 | 428.0 |
| Vinyl toluene | 36.5 | 292.0 |
| Methacrylic acid | 8.0 | 64.0 |
| N-vinyl-2-pyrrolidone | 2.0 | 16.0 |
| Benzoyl peroxide | | 20.0 |
| Benzyl trimethyl ammonium chloride (60 percent aqueous) | | 3.6 |
| Sodium hydroxide dispersion (40 percent in xylene) | | 74.4 |
| Epichlorohydrin | | 1,308.0 |
| Equivalent ratio of epichlorohydrin to methacrylic acid at the beginning of the polymerization | | 18.2 to 1 |
| Equivalent ratio of epichlorohydrin to carboxy polymer at the beginning of the formation of halohydrin ester | | 19.0 to 1 |

Following the polymerization procedure of Example 1, the monomers (in grams) are combined with 16 grams of benzoyl peroxide and the monomer catalyst solution is added to 1200 grams of the preheated epichlorohydrin. After heating for 60 to 90 minutes at 115° C. to 120° C. the additional 4 grams of benzoyl peroxide and 108 grams of epichlorohydrin are added and heating at 115° C. to 120° C. is continued for an additional 2 to 4 hours.

The halohydrin ester is then prepared according to Example 1 by heating the copolymer in its epichlorohydrin medium using the 3.6 grams of benzyl trimethyl ammonium chloride solution to bring about a reaction of the carboxy copolymer with 68.8 parts of the total 1308 parts of epichlorohydrin present, continuing the reaction until the acid value is less than one.

To dehydrohalogenate the halohydrin ester to form the glycidyl ester, as in Example 1, the flask contents are cooled, the 74.4 grams of sodium hydroxide dispersion are added and the contents heated. The product is then filtered and the epichlorohydrin replaced with high flash naphtha as set forth in Example 1. The resulting glycidyl methacrylate copolymer solution consists of 48.2 percent product in high flash naphtha, has a Gardner-Holdt viscosity of Y to Z, a color of 1 (Gardner scale) and an epoxide equivalent of 1293 (excluding solvent), the theoretical epoxide equivalent if all carboxyl groups are converted, being 1132.

EXAMPLE 3

| Material | Weight Percent | Parts by Weight |
| --- | --- | --- |
| Butyl acrylate | 17.0 | 34.0 |
| Methyl methacrylate | 45.0 | 90.0 |
| Vinyl toluene | 28.0 | 56.0 |
| Methacrylic acid | 8.0 | 16.0 |
| N-vinyl-2-pyrrolidone | 2.0 | 4.0 |
| Ditertiarybutyl peroxide | | 3.0+.75 |
| Benzyl trimethyl ammonium choride (60 percent aqueous) | | 0.9 |
| Xylene/butanol (85/15) | | 300.0 |
| Sodium hydroxide dispersion (40 percent in xylene) | | 18.6 |
| Epichlorohydrin | | 200.0 |
| Equivalent ratio of epichlorohydrin to carboxy polymer at the beginning of the formation of halohydrin ester | | 11.6 to 1 |

Following the polymerization procedure of Example 1, the monomers (employing grams) are combined with 3 grams of ditertiarybutyl peroxide and the monomer-catalyst solution is added to 200 grams of the preheated solvent, a xylene/butanol solution being used instead of epichlorohydrin. After heating for 60 to 90 minutes at 115° C. to 120° C. the additional .75 gram of ditertiarybutyl peroxide and 100 grams of the xylene/butanol solution are added and heating at 115° C. to 120° C. is continued for an additional 2 to 4 hours.

To prepare the halohydrin ester 200 grams of epichlorohydrin are added to the polymer solution and then according to Example 1, this copolymer solution is heated using the .9 gram of benzyl trimethyl ammonium chloride solution to bring about a reaction of the carboxy copolymer with 17.2 parts of the total 200 parts of epichlorohydrin present, continuing the reaction until the acid value is less than one.

To dehydrohalogenate the halohydrin ester to form the glycidyl ester, following Example 1, the flask contents are cooled, the 18.6 grams of sodium hydroxide dispersion are added and the contents heated. The product is then filtered and the epichlorohydrin replaced with high flash naphtha as set forth in Example 1 to form a glycidyl methacrylate copolymer solution consisting of 30.1 percent product in high flash naphtha. The copolymer has an epoxide equivalent of 1227 (excluding solvent).

EXAMPLE 4

| Material | Weight Percent | Parts by Weight |
| --- | --- | --- |
| Vinyl acetate | 87.0 | 435.0 |
| Crotonic acid | 13.0 | 65.0 |
| Benzoyl peroxide | | 15.0 |
| Benzyl trimethyl ammonium chloride (60 percent aqueous) | | 2.3 |
| Sodium hydroxide dispersion (40 percent in xylene) | | 75.5 |
| Epichlorohydrin | | 750.0 |
| Equivalent ratio of epichlorohydrin to crotonic acid during polymerization | | 7.2 to 1 |
| Equivalent ratio of epichlorohydrin to carboxy polymer at the beginning of the formation of halohydrin ester | | 10.7 to 1 |

Polymerization

In a 2 liter flask equipped with stirrer, reflux condenser, thermometer, and dropping funnel the 435.0 grams of vinyl acetate, the 65.0 grams of crotonic acid, the 15.0 grams of benzoyl peroxide and 500 grams of epichlorohydrin are heated to a temperature of 102° C. to 114° C. with agitation. The flask contents are then held at reflux for a period of two and one-half hours, known from nonvolatile determinations (2 hrs. at 150° C.) to be long enough for complete conversion to polymer.

Halohydrin ester formation

To the resulting hot polymer solution are added an additional 250 grams of epichlorohydrin. To bring about a reaction of the carboxy copolymer with 69.8 parts of the total 750 parts of epichlorohydrin present, 2.3 grams of benzyl trimethyl ammonium chloride solution are added to the flask contents which are held at a temperature of 110° C. to 115° C. for an additional hour.

Dehydrohalogenation

The halohydrin ester is dehydrohalogenated according to Example 1 to form the glycidyl ester. The flask contents are cooled, the 75.5 grams of sodium hydroxide dispersion are added and the contents heated. As in Example 1 the product is then filtered and the epichlorohydrin is replaced with a 50/50 Solvesso 100 [1]-ethylene glycol monoethyl ether acetate mixture. The resulting glycidyl crotonate copolymer consists of 39.9 percent product in a 50/50 Solvesso 100-ethylene glycol monoethyl ether acetate mixture and has an epoxide equivalent of 798 (excluding solvent). The theoretical epoxide equivalent is 717.

EXAMPLE 5

| Material | Weight Percent | Parts by Weight |
| --- | --- | --- |
| Vinyl toluene | 93.2 | 372.8 |
| Acrylic acid | 6.8 | 27.2 |
| Benzoyl Peroxide | | 10.0 |
| Benzyl trimethyl ammonium chloride (60 percent aqueous) | | 1.8 |
| Sodium hydroxide dispersion (40 percent in xylene) | | 37.8 |
| Epichlorohydrin | | 654.0 |
| Equivalent ratio of epichlorohydrin to acrylic acid during polymerization | | 18 to 1 |
| Equivalent ratio of epichlorohydrin to carboxy polymer at the beginning of the formation of halohydrin ester | | 10.6 to 1 |

Following the polymerization procedure of Example 1, the monomers (in grams) are combined with 8 grams of benzoyl peroxide and the monomer-catalyst solution is added to 600 grams of the preheated epichlorohydrin. After heating for 60 to 90 minutes at 115° C. to 120° C. the additional 2 grams of benzoyl peroxide and 27 grams of epichlorohydrin are added and heating at 115° C. to 120° C. is continued for an additional 2 to 4 hours.

To prepare the halohydrin ester 27 grams of epichlorohydrin are added to the polymer solution and then according to Example 1, this copolymer solution is heated using the 1.8 grams of benzyl trimethyl ammonium chloride solution to bring about a reaction of the carboxy copolymer with 34.8 parts of the total 654 parts of epichlorohydrin present, continuing the reaction until the acid value is less than one.

To dehydrohalogenate the halohydrin ester to form the glycidyl ester, as in Example 1, the flask contents are cooled, the 37.8 grams of sodium hydroxide dispersion are added and the contents heated. The product is then filtered and the epichlorohydrin replaced with high flash naphtha as set forth in Example 1. The resulting glycidyl methacrylate copolymer solution consists of

---

[1] Solvesso 100 is a 95 percent aromatic petroleum hydrocarbon having a boiling range of 315° F. to 355° F. with 90 percent boiling between 315° F. and 338° F.

48.0 percent product in high flash naphtha. The copolymer has an epoxide equivalent of 1208 (excluding solvent). The theoretical epoxide equivalent is 1113.

EXAMPLE 6

| Material | Weight Percent | Parts by Weight |
|---|---|---|
| Methyl methacrylate | 65.8 | 263.2 |
| Acrylonitrile | 21.9 | 87.6 |
| Acrylic acid | 12.3 | 49.2 |
| Benzoyl peroxide | 2.5 | 10.0 |
| Benzyl trimethyl ammonium chloride (60 percent aqueous) | | 1.9 |
| Sodium hydroxide (flake) | | 27.4 |
| Epichlorohydrin | | 695.0 |
| Equivalent ratio of epichlorohydrin to acrylic acid during polymerization | | 10 to 1 |
| Equivalent ratio of epichlorohydrin to carboxy polymer at beginning of formation of halohydrin ester | | 11 to 1 |

Following the polymerization procedure of Example 1, the monomers are combined with 8 grams of benzoyl peroxide and the monomer-catalyst solution is added to 600 grams of the preheated epichlorohydrin. After heating for 60 to 90 minutes at 115° C. to 120° C., the additional 2 grams of benzoyl peroxide and 95 grams of epichlorohydrin are added and heating at 115° C. to 120° C. is continued for an additional 2 to 4 hours.

The halohydrin ester is then prepared according to Example 1 by heating the copolymer in its epichlorohydrin medium using the 1.9 grams of benzyl trimethyl ammonium chloride solution to bring about a reaction of the carboxy copolymer with 62.9 parts of the total 695 parts of epichlorohydrin present, continuing the reaction until the acid value is less than one.

To dehydrohalogenate the halohydrin ester to form the glycidyl ester, the flask contents are cooled, the 27.4 grams of flaked sodium hydroxide are added and the contents heated as in Example 1. The product is then filtered and the epichlorohydrin replaced with diacetone alcohol as set forth in Example 1. The resulting glycidyl acrylate copolymer solution consists of 37.2 percent product in diacetone alcohol. The copolymer has an epoxide equivalent of 893 (excluding solvent). The theoretical epoxide equivalent is 640.

EXAMPLE 7

| Material | Weight Percent | Parts by Weight |
|---|---|---|
| Methacrylic acid | 70.8 | 212.4 |
| Vinyl toluene | 29.2 | 87.6 |
| Propylene glycol methyl ether | | 500.0 |
| Benzoyl peroxide | | 7.5 |
| Benxyl trimethyl ammonium chloride (60 percent aqueous) | | 11.0 |
| Sodium hydroxide dispersion (40 percent in xylene) | | 247.0 |
| Epichlorohydrin | | 1,830.0 |
| Equivalent ratio of epichlorohydrin to carboxy polymer at beginning of formation of halohydrin ester | | 8 to 1 |

Following the polymerization procedure of Example 1, the monomers are combined with 6 grams of benzoyl peroxide and the monomer-catalyst solution is added to 600 grams of the preheated solvent, made up of 400 grams of epichlorohydrin and 500 grams of propylene glycol methyl ether. After heating for 60 to 90 minutes at 115° C. to 120° C. the additional 1.5 grams of benzoyl peroxide and 30 grams of epichlorohydrin are added and heating at 115° C. to 120° C. is continued for an additional 2 to 4 hours.

To prepare the halohydrin ester 1400 grams of epichlorohydrin are added to the polymer solution and then according to Example 1, this copolymer solution is heated using the 11 grams of benzyl trimethyl ammonium chloride solution to bring about a reaction of the carboxy copolymer with 228.5 parts of the total 1830 parts of epichlorohydrin present, continuing the reaction until the acid value is less than one.

To dehydrohalogenate the halohydrin ester to form the glycidyl ester, following Example 1, the flask contents are cooled, the 247 grams of sodium hydroxide dispersion are added and the contents heated. The product is then filtered and the epichlorohydrin replaced with 2-ethoxy ethanol acetate as set forth in Example 1. The resulting glycidyl methacrylate copolymer solution consists of 40.8 percent product in 2-ethoxy ethanol acetate. The copolymer has an epoxide equivalent of 197 (excluding solvent). The theoretical epoxide equivalent is 177.

EXAMPLE 8

| Material | Weight Percent | Parts by Weight |
|---|---|---|
| Ethyl acrylate | 44.35 | 600.0 |
| Styrene | 39.02 | 528.0 |
| Methacrylic acid | 16.63 | 225.0 |
| Benzoyl peroxide | | 25.0 |
| Benzyl trimethyl ammonium methoxide (40 percent in methanol) | | 3.0 |
| Sodium hydroxide dispersion (40 percent in xylene) | | 105.0 |
| Epichlorohydrin | | 2,491.0 |
| Equivalent ratio of epichlorohydrin to methacrylic acid during polymerization | | 6 to 1 |
| Equivalent ratio of epichlorohydrin to carboxy polymer at the beginning of the formation of halohydrin ester | | 10 to 1 |

Following the polymerization procedure of Example 1, the monomers are combined with the 25 grams of benzoyl peroxide and the monomer-catalyst solution is added to 1500 grams of preheated epichlorohydrin. This resulting solution is heated at 115° C. to 120° C. for a period of 2 to 4 hours.

The halohydrin ester is then prepared according to Example 1, by heating the copolymer in 991 grams of additional epichlorohydrin using the 3 grams of benzyl trimethyl ammonium methoxide solution to bring about a reaction of the carboxy copolymer with 241 parts of the total 2491.0 parts of epichlorohydrin present, continuing the reaction until the acid value is less than one.

To dehydrohalogenate the halohydrin ester to form the glycidyl ester, the flask contents are cooled, the 105.0 grams of sodium hydroxide dispersion are added and the contents heated as in Example 1.

The epichlorohydrin medium is then replaced with solvent in a manner somewhat different from that employed in Example 1. The product is vacuum distilled until substantially all of the calculated amount of water and epichlorohydrin are removed. This is done by gradually raising the temperature to 310° F. at 5 mm. Hg and holding the material at this temperature for 15 minutes, removing 2225 parts of distillate. Solvesso 100 [1] (1300 grams) is then added and an additional 178 grams of distillate are removed to insure complete removal of epichlorohydrin. The resulting is a 50 percent product glycidyl methacrylate copolymer in Solvesso 100 and butanol. This solution has a Gardner-Holdt viscosity of U to V, a color of 1 to 2 (Gardner scale) and an actual epoxide equivalent of 704 (excluding solvent). The theoretical epoxide equivalent is 573.

EXAMPLE 9

| Material: | Parts by weight |
|---|---|
| Methacrylic acid | 22.2 |
| Styrene | 147.6 |
| Benzoyl peroxide | 4.0 |
| Benzyl trimethyl ammonium chloride (60 percent aqueous) | 1.5 |

---
[1] Solvesso 100 is a 95 percent aromatic petroleum hydrocarbon having a boiling range of 315° F. to 355° F. with 90 percent boiling between 315° F. and 338° F.

| Material: | Parts by weight |
|---|---|
| Sodium hydride (50 percent in Bayol 1–85 [1]) | 12.2 |
| Epichlorohydrin | 224.8 |
| Equivalent ratio of epichlorohydrin to methacrylic acid at beginning of polymerization reaction, 9.4 to 1. | |

[1] A highly refined whie mineral oil having a viscosity (Saybolt) of 80 to 90 at 100° F. and a distillation range of 295° C. to 466° C. (atmospheric).

The 224 grams of epichlorohydrin and the 1.5 grams of benzyl trimethyl ammonium chloride are heated with agitation to reflux (115° C. to 120° C.) at which temperature the monomer-catalyst solution, prepared by mixing the methacrylic acid, styrene, and benzoyl peroxide in the amount (grams) shown above, is added through the dropping funnel. After all of the monomer-catalyst solution is added the flask contents are held at reflux for a period of three hours. High flash naphtha (100 grams) is then added and an epichlorohydrin-water azeotrope is distilled off. The distillate is replaced by an equal weight of epichlorohydrin. The resulting solution is cooled to room temperature and the sodium hydride is added in two equal portions, one at a time in order to control the exothermic reaction. After the addition of the sodium hydride the flask contents are heated to 120° C. and held for a period of one to three hours. Tre resulting solution is filtered and vacuum distilled in accordance with Example 1, and 546 grams of distillate are collected while 600 grams of high flash naphtha are added to the flask contents. The following physical constants were determined on the final product:

Non-volatile=25 percent (2 hrs. at 125° C.)
Epoxide equivalent (excluding solvent)=721

While this invention in its main aspect pertains to the preparation of glycidyl esters of preformed carboxy copolymers, it is emphasized that the same principles apply if the polymerization reaction and the epihalohydrin-carboxy reaction take place concomitanaly. In fact, it has already been pointed out that N-vinyl pyrrolidone is an epihalohydrin-carboxy catalyst as well as a desirable monomer. Hence when it is used as a monomer some epihalohydrin reacts with carboxyl groups during polymerization. If desired, therefore, both a carboxy-epoxy catalyst and a polymerization catalyst can be used and the halohydrin ester made in one step. However, if the excess epihalohydrin of at least 8 to 11 equivalents epihalohydrin to 1 carboxy equivalent is not used in accordance with this invention the entire system will gel as illustrated by the following example.

EXAMPLE 10

| Material | I Parts by Weight | II Parts by Weight |
|---|---|---|
| Methacrylic acid | 22.2 | 50.0 |
| Styrene | 147.6 | 332.0 |
| Benzoyl peroxide | 4.0 | 9.7 |
| Benzyl trimethyl ammonium chloride (60 percent aqueous) | 1.5 | 3.5 |
| Sodium Hydroxide (flake) | | 24.0 |
| Xylene | 100.0 | |
| Epichlorohydrin | 124.0 | 594.0 |
| Equivalent ratio of epichlorohydrin to methacrylic acid at beginning of polymerization reaction | 5.2 to 1 | 11 to 1 |

I. In a 2 liter flask equipped with stirrer, thermometer, dropping funnel, and downward condenser the 124.0 grams of epichlorohydrin, the 100 grams of the xylene, and the 1.5 grams of benzyl trimethyl ammonium chloride solution are heated with agitation to reflux (115° C. to 120° C.) at which temperature a monomer catalyst solution, prepared by mixing the methacrylic acid, styrene, and benzoyl peroxide in the amount shown above in column I, is added through the dropping funnel. After all of the monomer-catalyst solution is added the flask contents are held at reflux for a period of three hours. The flask contents gelled at this point.

II. Another reaction is carried out using the same monomers and procedure of I but in the amounts of column II. In this instance the ratio of epichlorohydrin to methacrylic acid at the beginning of the polymerization reaction is 11 to 1 instead of 5.2 to 1 (ratio present in I). Following procedure I, 594.0 grams of the epichlorohydrin and 3.5 grams of the benzyl trimethyl ammonium chloride solution are heated with agitation to reflux (115° C. to 120° C.), at which temperature an epichlorohydrin-water azeotrope is distilled off until the distillate becomes clear. This distillate is replaced with an equal weight of epichlorohydrin. The downward condenser is replaced with a reflux condenser. Beginning at this point and continuing over a period of two hours the monomer-catalyst solution, prepared by mixing the methacrylic acid, styrene, and benzoyl peroxide in the amount (grams) shown in column II above, is added through the dropping funnel. After all of the monomer-catalyst solution is added the flask contents are held at reflux for a period of two and one-half hours.

Xylene (200 grams) is then added to the flask contents. The pot temperature is then adjusted to 70° to 90° C. at which temperature 24 grams of flaked sodium hydroxide are added over a period of twenty minutes. The flask contents are then heated to reflux and held at that temperature for a period of three hours after which an epichlorohydrin-water azeotrope is distilled off until the distillate becomes clear. The distillate is replaced with 200 grams of xylene. The resulting solution is filtered through filter paper using a one inch sodium chloride bed over the filter paper. After the material is filtered 300 grams of high flash naphtha are added and the flask is arranged for vacuum distillation. Flask contents are vacuum distilled at 50° C. to 60° C. and 25 to 35 mm. Hg; and 1600 grams of distillate are collected. This is replaced by 1600 grams of high flash naphtha which are added to the flask contents. The following physical constants are determined on the final product:

Non-volatile=35.4 percent (2 hrs. at 150° C.)
Epoxide equivalent (excluding solvent)=682 or (non-volatile portion)

Example 10 thus shows that rather than making the copolymer first, it is possible to carry out both the polymerization reaction and the carboxy-epoxy reaction at the same time if the epihalohydrin to acid ratio is sufficiently large. However, in these instances where two catalysts are employed the conversion to copolymer is usually down five to ten percent. Accordingly the two step method is the preferred method. Other variations will also occur to one skilled in the art. For instance in view of the use of a quaternary ammonium salt and excess epihalohydrin, caustic alkali need not be employed. The copolymer can be made as follows:

EXAMPLE 11

| Material | Weight Percent | Parts by Weight |
|---|---|---|
| Methyl methacrylate | 53.5 | 107.0 |
| Vinyl toluene | 36.5 | 73.0 |
| N-vinyl-2-pyrrolidone | 2.0 | 4.0 |
| Methacrylic acid | 8.0 | 16.0 |
| Benzoyl peroxide | 2.5 | 5.0 |
| Benzyl trimethyl ammonium chloride (60 percent aqueous) | | 1.0 |
| Epichlorohydrin | | 327.0 |
| Equivalent ratio of epichlorohydrin to methacrylic acid during polymerization | 17.7 to 1 | |

The glycidyl methacrylate copolymer solution of this example is prepared exactly as the copolymer solution in Example 2 except for one step. In this example no sodium hydroxide is used to dehydrohalogenate the halohydrin ester as in Example 2, the benzyl trimethyl ammonium chloride present being sufficient to dehydrohalogenate approximately 75 percent of the halohydrin ester groups without further addition of sodium hydroxide. Following Example 2, after the formation of the chlorohydrin esters, the excess epichlorohydrin and most of the glycerol dichlorohydrin formed are replaced with Solvesso 100 [1]. The resulting glycidyl methacrylate copolymer solution consists of 43.7 percent product in Solvesso 100. The copolymer has an epoxide equivalent of 1509 (excluding solvent).

These and such other variations as are obvious to one skilled in the art are deemed to be within the scope of this invention.

What is claimed is:

1. A process for preparing a copolymer having glycidyl ester groups which comprises:
   (1) copolymerizing, in an organic solvent, in the presence of a free radical polymerization catalyst, (A) from about 5% to about 75% by weight, based on the total weight of monomers present, of a monomeric, $\alpha,\beta$-monoethylenically unsaturated aliphatic monocarboxylic acid having not more than four carbon atoms, with (B) a different monoethylenically unsaturated comonomer free of carboxylic acid groups, to form a first copolymer having carboxyl groups, said solvent being at least 40% by weight of the total solution and being unreactive with said monomers and said first copolymer under free radical polymerization conditions,
   (2) reacting said first copolymer, at a temperature of from 50° C. to 175° C. in the presence of a catalytic amount of a catalyst selected from the group consisting of tertiary amines, quaternary ammonium hydroxides, quaternary ammonium salts and N-vinylpyrrolidones, with an excess of an epihalohydrin such that the equivalent ratio of said epihalohydrin to carboxylic acid groups in said first copolymer is at least 8:1, respectively, to form a second copolymer having halohydrin ester groups, and
   (3) dehydrohalogenating the halohydrin ester groups in said second copolymer by reacting said second copolymer, at a temperature of from 50° C. to about 115° C., with sufficient alkaline material to combine with the halogen of said halohydrin ester groups, to form said copolymer having glycidyl ester groups.

2. A process as described in claim 1 wherein said epihalohydrin is epichlorohydrin.

3. A process as described in claim 1 wherein said organic solvent is epichlorohydrin.

4. A process as described in claim 1 wherein said organic solvent is an organic solvent other than an epihalohydrin.

5. A process as described in claim 1 wherein said organic solvent is a mixture of an organic solvent other than an epihalohydrin with epichlorohydrin.

6. A process as described in claim 1 wherein said (A) is selected from the group consisting of acrylic acid, methacrylic acid and crotonic acid and is present in an amount ranging from about 5% to about 50% by weight, based on the total weight of monomers present, said (B) is selected from the group consisting of esters of $\alpha,\beta$-monoethylenically unsaturated monocarboxylic acids having not more than four carbon atoms with saturated monohydric alcohols having not more than six carbon atoms, and monovinyl aromatic compounds, and said free radical polymerization catalyst is an organic peroxide.

7. A process as described in claim 1 wherein said carboxyepoxy catalyst is a quaternary ammonium salt.

8. A process as described in claim 1 wherein said carboxyepoxy catalyst is benzyltrimethylammonium chloride.

9. A process as described in claim 1 wherein said caustic material is sodium hydroxide.

References Cited by the Examiner

UNITED STATES PATENTS

| 2,607,761 | 8/1952  | Seymour         | 260—78.4 |
| 2,772,296 | 11/1956 | Mueller         | 260—78.4 |
| 2,866,767 | 12/1958 | Fang            | 260—78.4 |
| 2,927,102 | 3/1960  | Breitenbach et al. | 260—88.1 |

FOREIGN PATENTS 159,360    4/1953    Australia.

JOSEPH L. SCHOFER, Primary Examiner.

HAROLD N. BURSTEIN, PHILLIP E. MANGAN, LEON J. BERCOVITZ, Examiners.

J. T. BROWN, A. LIBERMAN, H. WONG,
Assistant Examiners.

---

[1] Solvesso 100 is a 95 percent aromatic petroleum hydrocarbon having a boiling range of 315° F. to 355° F. with 90 percent boiling between 315° F. and 338° F.